United States Patent
Barton (10) Patent No.: US 8,380,118 B2
(45) Date of Patent: Feb. 19, 2013

(54) APPARATUS AND METHOD FOR STRIPPER FINGER OPERATION

(75) Inventor: Augusto E. Barton, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 225 days.

(21) Appl. No.: 12/871,373

(22) Filed: Aug. 30, 2010

(65) Prior Publication Data
US 2012/0051826 A1    Mar. 1, 2012

(51) Int. Cl.
*G03G 15/14*    (2006.01)

(52) U.S. Cl. ......................... 399/398; 399/323

(58) Field of Classification Search .......... 399/323, 399/398–399
See application file for complete search history.

(56) References Cited

U.S. PATENT DOCUMENTS

| | | | | |
|---|---|---|---|---|
| 4,752,811 | A * | 6/1988 | Takahashi | 399/399 |
| 6,640,062 | B2 * | 10/2003 | Tsubaki et al. | 399/44 |
| 2003/0039491 | A1 * | 2/2003 | Bogoshian | 399/323 |
| 2008/0298861 | A1 * | 12/2008 | Howe | 399/323 |

FOREIGN PATENT DOCUMENTS
JP    02188779 A * 7/1990

OTHER PUBLICATIONS

Piezo Systems, Inc.; "Proportional Voltage Booster"; http://www.piezo.com/prodelect4evb304.html; Woburn, MA, USA; Aug. 25, 2010.
Piezo Systems, Inc.; Piezoceramic Sheets and Their Properties; http://www.piezo.com/prodsheet1sq5A.html; Woburn, MA, USA; Aug. 25, 2010.

* cited by examiner

*Primary Examiner* — David Gray
*Assistant Examiner* — G. M. Hyder
(74) *Attorney, Agent, or Firm* — Ronald E. Prass, Jr.; Prass LLP (57) ABSTRACT

An apparatus and method that operates a stripper finger. The apparatus can include a media path configured to transport a media sheet. The apparatus can include a rotational member configured to contact the media sheet. The apparatus can include a stripper finger having a length along a longitudinal axis. The stripper finger can include tip at an end of the length. The stripper finger can be configured to selectively engage and disengage contact between the tip and the rotational member to selectively strip the media sheet from the rotational member.

15 Claims, 6 Drawing Sheets

APPARATUS AND METHOD FOR STRIPPER FINGER OPERATION

BACKGROUND

Disclosed herein is an apparatus and method that operates a stripper finger in a printing apparatus.

Presently, image output devices, such as printers, multifunction media devices, xerographic machines, ink jet printers, and other devices produce images on media sheets, such as paper, substrates, transparencies, plastic, labels, or other media sheets. To produce an image, marking material, such as toner, ink jet ink, or other marking material, can be applied to a photoreceptor or an intermediate transfer member. The marking material is then transferred to a media sheet to create a latent image on the media sheet. A fuser assembly then affixes or fuses the latent image to the media sheet by applying heat and/or pressure to the media sheet. Fuser assemblies apply pressure using rotational members, such as fuser rolls or belts, which are coupled to each other at a fuser nip. Pressure is applied to the media sheet with the latent image as the media sheet is fed through the fuser nip.

Media sheets often stick to rotational members in a printing apparatus. For example, heat and pressure can cause a relatively thin media sheet to stick to a fuser roll. As another example, electrostatic forces can cause thin media sheets to stick to photoreceptor rolls, photoreceptor belts, and intermediate transfer members. Stripper fingers have been traditionally used to help separate the media sheets from the fuser rolls and pressure rolls, photoreceptor drums and belts, and other rotational members.

Unfortunately, stripper fingers wear the surface of rotational members. This causes a problem because the wear results in image quality defects on media sheets. The wear is exasperated because stripper fingers are in constant contact with a rotational member surface even though stripping is only required for certain media and/or certain operating conditions. This contact is unnecessary and induces an increased amount of unnecessary wear.

Thus, there is a need for an apparatus and method that operates a stripper finger in a printing apparatus.

SUMMARY

An apparatus and method that operates a stripper finger is disclosed. The apparatus can include a media path configured to transport a media sheet. The apparatus can include a rotational member configured to contact the media sheet. The apparatus can include a stripper finger having a length along a longitudinal axis. The stripper finger can include tip at an end of the length. The stripper finger can be configured to selectively engage and disengage contact between the tip and the rotational member to selectively strip the media sheet from the rotational member.

BRIEF DESCRIPTION OF THE DRAWINGS

In order to describe the manner in which advantages and features of the disclosure can be obtained, a more particular description of the disclosure briefly described above will be rendered by reference to specific embodiments thereof, which are illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

The embodiments include an apparatus for operating a stripper finger in an apparatus. The apparatus can include a media path configured to transport a media sheet. The apparatus can include a rotational member configured to contact the media sheet. The apparatus can include a stripper finger having a length along a longitudinal axis. The stripper finger can include tip at an end of the length. The stripper finger can be configured to selectively engage and disengage contact between the tip and the rotational member to selectively strip the media sheet from the rotational member.

The embodiments further include a method of operating a stripper finger in an apparatus having a media path, a rotational member, and a stripper finger. The stripper finger can have a length along a longitudinal axis and can have a tip at an end of the length. The method can include transporting the media sheet in the media path. The method can include contacting the media sheet with the rotational member. The method can include engaging contact between the stripper finger tip and the rotational member to strip the media sheet from the rotational member. The method can include disengaging contact between the stripper finger tip and the rotational member.

The embodiments further include an apparatus for operating a stripper finger in a printing apparatus. The printing apparatus can include a media path configured to transport a media sheet. The printing apparatus can include an image generation module configured to generate an image on the media sheet. The printing apparatus can include a rotational member configured to contact the media sheet. The printing apparatus can include a stripper finger having a length along a longitudinal axis. The stripper finger can include a tip at an end of the length. The stripper finger can be configured to strip the media sheet from the rotational member. The printing apparatus can include a piezoelectric actuator coupled to the stripper finger. The printing apparatus can include a voltage source coupled to the piezoelectric actuator. The voltage source can be configured to apply a first voltage to the piezoelectric actuator to engage contact between the stripper finger tip and the rotational member to strip the media sheet from the rotational member. The voltage source can be configured to apply a second voltage to the piezoelectric actuator to disengage contact between the stripper finger tip and the rotational member.

Figure 1:
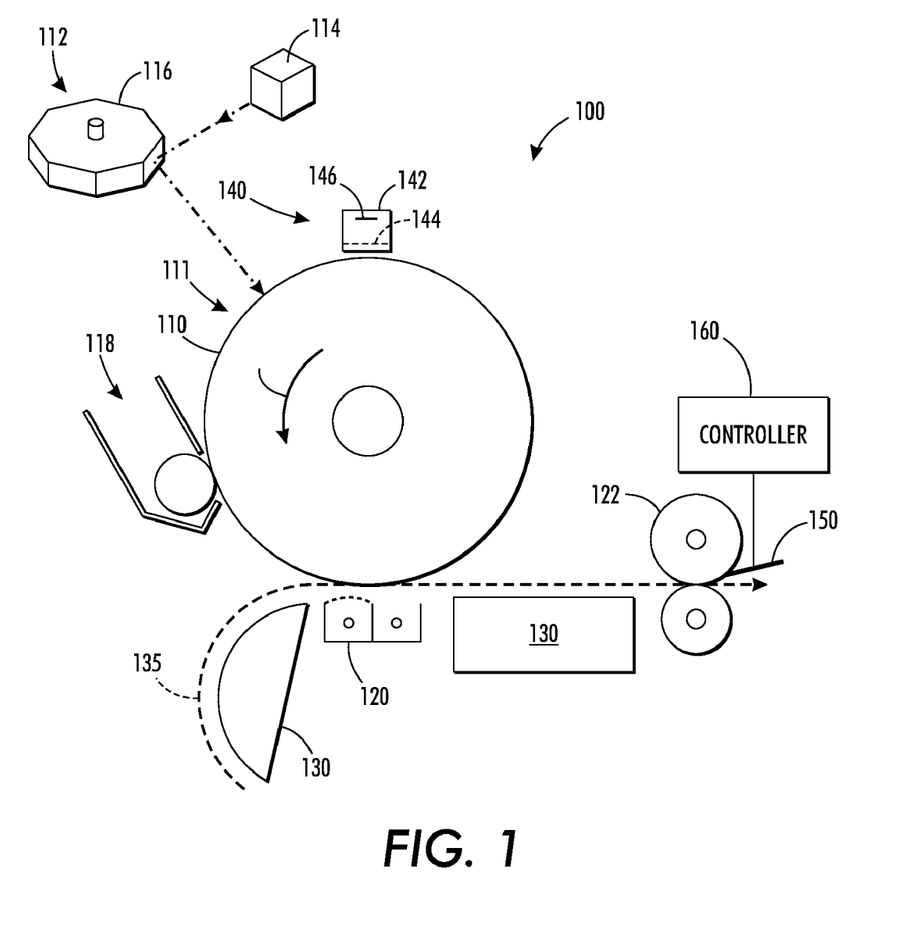
FIG. 1 is an exemplary illustration of an apparatus.

FIG. 1 is an exemplary illustration of an apparatus 100, such as an electrostatographic printing apparatus, a xerographic printing apparatus, or any other apparatus that generates an image on media. The apparatus 100 may also be part of a printer, a multifunction media device, a xerographic machine, a laser printer, an ink-jet printer, a scanner, a facsimile machine, or any other device that transports media sheets.

The apparatus 100 can include a media transport 130 that can transport media 135, such as paper, plastic, labels, stickers, or other media. The apparatus 100 can include a photoreceptor 110 movable in a process direction P. The photoreceptor 110 can have a main or charge transport surface 111. The photoreceptor 110 can be configured to generate an image on the media 135. For example, the photoreceptor 110 can be a belt or drum and can include a photoreceptor charge transport surface 111 for forming electrostatic images thereon.

The apparatus 100 can include a charger 140 configured to generate a charge on the photoreceptor 110. The charger 140 can be a scorotron, a charge roll, or any other electric field generation device, that can apply a voltage to a photoreceptor 110. For example, a scorotron 140 can include a scorotron shield 142, a scorotron charging grid 144, and a scorotron wire or pin array 146 located on an opposite side of the scorotron charging grid 144 from the photoreceptor 110. The scorotron pin array 146 can be configured to generate an electric field. The scorotron charging grid 144 and the scorotron pin array 146 can be configured to generate a surface potential on the photoreceptor 110. In a more detailed operation, the charger 140 can charge the photoreceptor 110 surface by imparting an electrostatic charge on the surface of the photoreceptor 110 as the photoreceptor 110 rotates in the process direction P.

The apparatus 100 can include an image generation module 112 configured to generate an image on the photoreceptor 110. The image generation module 112 can be a raster output scanner, such as a laser source, a Light Emitting Diode (LED) bar, or other relevant device, that can discharge selected portions of the photoreceptor 110 in a configuration corresponding to a desired image to be printed. For example, a raster output scanner can discharge a latent image to a more positive voltage. As a further example, the image generation module 112 can be a raster output scanner that can include a laser source 114 and a rotatable mirror 116, which can act together to discharge certain areas of the surface of the photoreceptor 110 according to a desired image to be printed. Other elements can be used instead of a laser source 114 to selectively discharge the charge-retentive surface 111, such as an LED bar, a light-lens system, or other elements that can discharge a charge-retentive surface. The laser source 114 can be modulated in accordance with digital image data fed into it, and the rotatable mirror 116 can cause the modulated beam from the laser source 114 to move in a fast-scan direction perpendicular to the process direction P of the photoreceptor 110.

The apparatus 100 can include a developer unit 118 coupled to the photoreceptor 110. The developer unit 118 can be configured to develop the image on the photoreceptor 110. For example, after certain areas of the photoreceptor 110 are discharged by the laser source 114, the developer unit 118 can develop an exposed latent image. The developer unit 118 can cause a supply of marking material, such as dry toner, to contact or otherwise approach the exposed latent image on the surface of the photoreceptor 110.

The apparatus 100 can include a transfer unit 120 coupled to the photoreceptor 110. The transfer unit 120 can be configured to transfer the developed image to the media 135. For example, the transfer unit 120 can cause toner or other marking material, adhering to the photoreceptor 110 to be electrically transferred to the media 135. The apparatus 100 can include a fuser 122 that can permanently affix the image to the media 135. For example, the fuser 122 can cause marking material, such as toner, to melt or fuse into the media 135 to create a permanent image on the media 135.

The apparatus 100 can include a rotational member configured to contact a media sheet 135. The rotational member can be a roll, can be a drum, can be a belt, can be the photoreceptor 110, can be a fuser roll, a pressure roll, or a fusing belt in the fuser 122, or can be any other rotational member that can contact a media sheet. The apparatus 100 can include a stripper finger 150 that can selectively engage and disengage contact with the rotational member to selectively strip the media sheet 135 from the rotational member. The apparatus 100 can include a controller 160 configured to control operations of the apparatus 100. For example, the controller 160 can control whether the stripper finger 150 engages or disengages contact with the rotational member.

Figure 2:
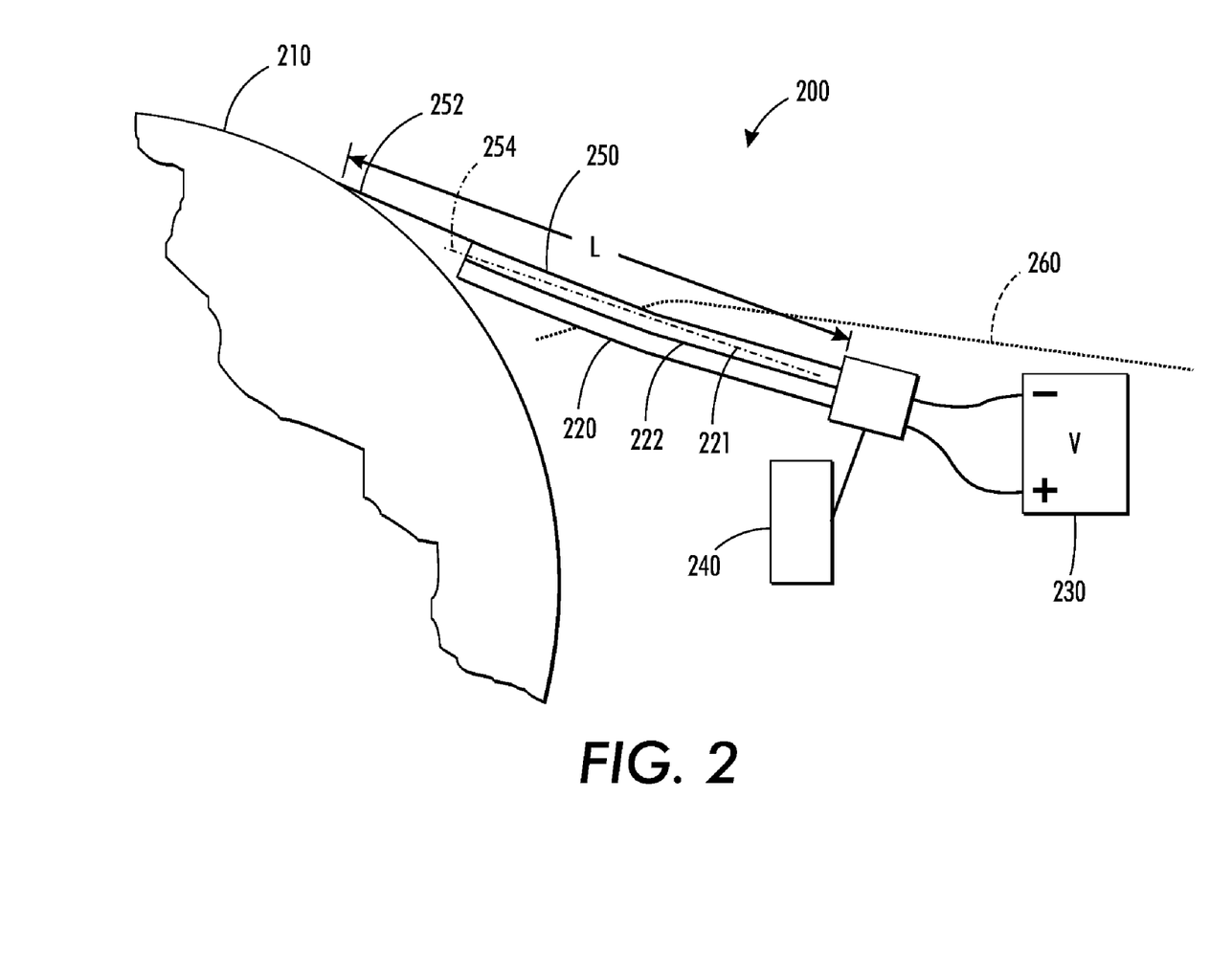
FIG. 2 is an exemplary illustration of a portion of an apparatus.

FIG. 2 is an exemplary illustration of a portion of an apparatus 200, such as a portion of the apparatus 100. The apparatus 200 can include a rotational member 210. The apparatus 200 can include a baffle 260 configured to receive a media sheet from the rotational member 210. The apparatus 200 can include a stripper finger 250, such as the stripper finger 150. The stripper finger 250 can be coupled to a frame 240. The stripper finger 250 can have a length L along a longitudinal axis 254. The stripper finger 250 can include tip 252 at an end of the length L. The stripper finger 250 can selectively engage and disengage contact between the tip 252 and the rotational member 210 to selectively strip media sheets from the rotational member 210.

The apparatus 200 can include a piezoelectric actuator 220 coupled to the stripper finger 250. The piezoelectric actuator 220 can selectively engage and disengage contact between the stripper finger tip 252 and the rotational member 210. For example, the piezoelectric actuator 220 can bend to selectively engage and disengage contact between the stripper finger tip 252 and the rotational member 210. The apparatus 200 can include a voltage source 230 coupled to the piezoelectric actuator 220. The voltage source 230 can apply a first voltage to the piezoelectric actuator 220 to engage contact between the stripper finger tip 252 and the rotational member 210 and can apply a second voltage to the piezoelectric actuator 220 to disengage contact between the stripper finger tip 252 and the rotational member 210.

The piezoelectric actuator can include a first layer 221 coupled to the stripper finger 250 along at least a portion of the length L and a second layer 222 coupled to the first layer substantially parallel to the longitudinal axis. The voltage source 230 can apply a voltage between the piezoelectric actuator first layer 221 and the piezoelectric actuator second layer 222 to selectively engage and disengage contact between the stripper finger tip 252 and the rotational member 210.

The piezoelectric actuator 220 can adjust pressure of the stripper finger tip 252 against the rotational member 210 when the stripper finger tip 252 contacts the rotational member 210. For example, the voltage source 230 can apply different voltages to apply different amounts of pressure of the stripper finger tip 252 against the rotational member 210.

Figure 3:
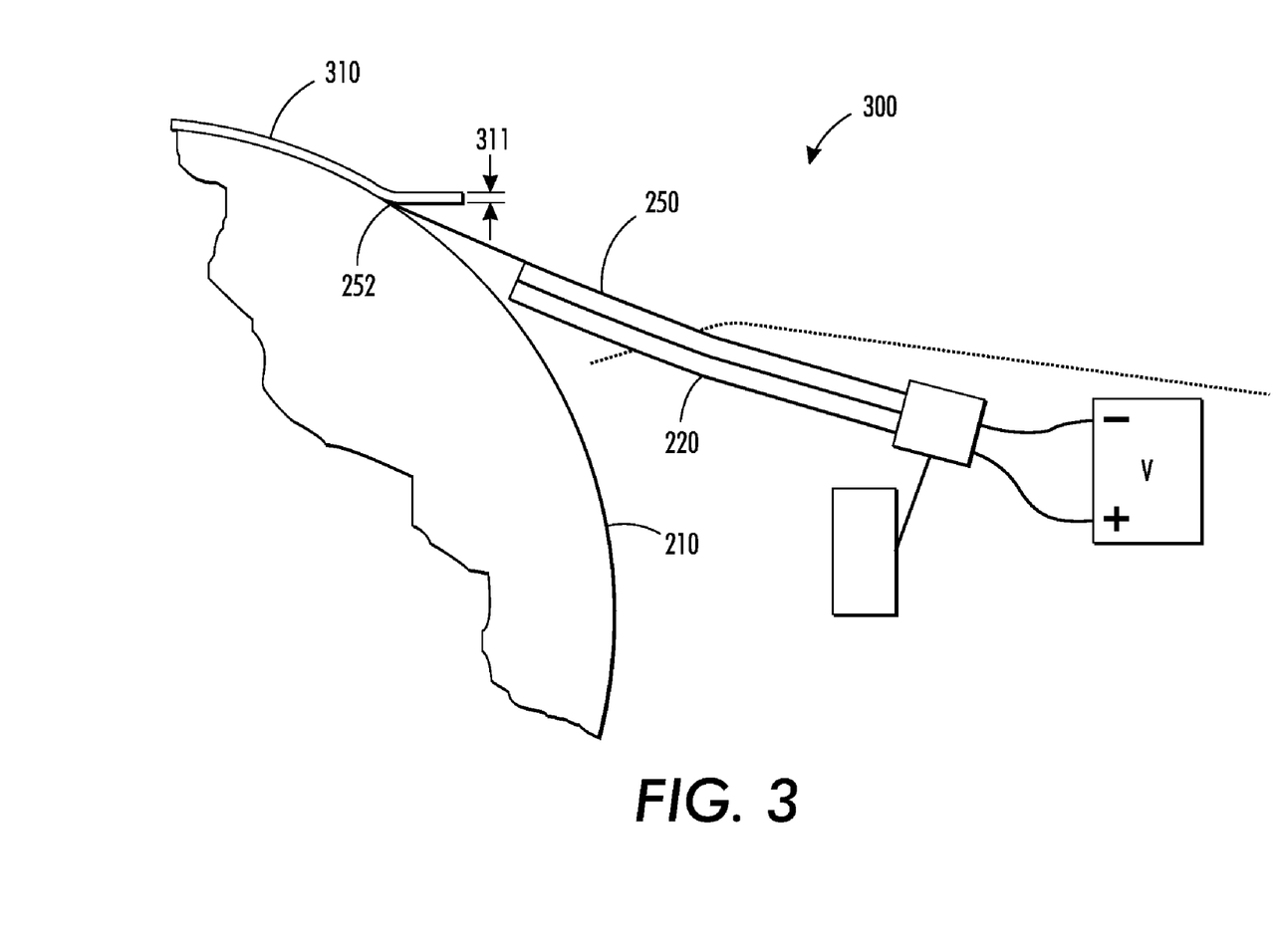
FIG. 3 is an exemplary illustration of a portion of an apparatus.
Figure 4:
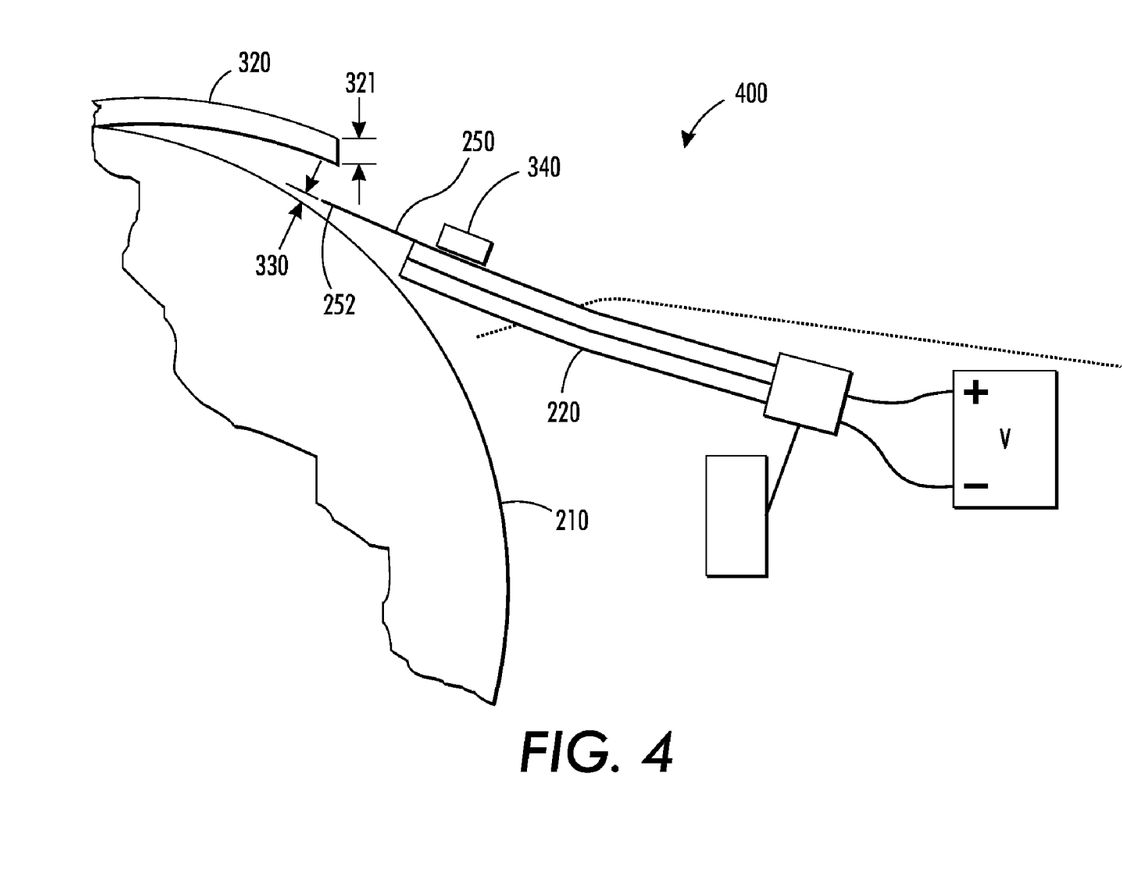
FIG. 4 is an exemplary illustration of a portion of an apparatus.

FIG. 3 is an exemplary illustration of a portion of an apparatus 300, such as a portion of the apparatus 100. FIG. 4 is an exemplary illustration of a portion of an apparatus 400, such as a portion of the apparatus 100. The stripper finger 250 can engage contact between the stripper finger tip 252 and the rotational member 210 to strip media sheet 310 from the rotational member 210 and can disengage contact between the stripper finger tip 252 and the rotational member 210 when there is no media sheet coupled to the rotational member 210. The stripper finger 250 can engage contact between the stripper finger tip 252 and the rotational member 210 to strip a first weight media sheet 310 from the rotational member 210 and can disengage contact between the stripper finger tip 252 and the rotational member 210 for a second weight media sheet 320, where the second weight can be greater than the first weight. For example, a lighter weight media sheet may require stripping where a heavier weight media sheet may self-strip.

As a further example, the first weight media sheet 310 can have a first thickness 311. The second weight media sheet 320 can have a second thickness 321 greater than the first thickness 311. The stripper finger 250 can be configured to engage contact between the stripper finger tip 252 and the rotational member 210 for the first weight media sheet 310 to strip the first weight media sheet 310 from the rotational member 210 and can be configured to move a displacement distance 330 to disengage contact between the stripper finger tip 252 and the rotational member 210 for the second weight media sheet 320, where the displacement distance 330 can be substantially between the first thickness 311 and the second thickness 321. The first thickness 311 can be relatively thin or may be thicker, but still may require stripping. The displacement distance 330 can be any distance useful for removing the stripper finger tip 252 from the rotational member 210.

The printing apparatus 400 can include a mechanical stop 340 configured to contact the stripper finger 250 after the stripper finger 250 moves the displacement distance 330 from the rotational member 210 after the stripper finger tip 252 disengages contact with the rotational member 210. The mechanical stop 340 can prevent the stripper finger 250 from moving farther than the displacement distance 330 when it disengages contact with the rotational member 210. The mechanical stop 340 may not be necessary and the displacement distance 330 can be controlled by applying an appropriate voltage to the piezoelectric actuator.

Some embodiments can use piezoelectric actuators to move the stripper fingers away from a surface, where the surface can be on a fuser roll, pressure roll, fusing belt, photoreceptor drum, belt, or other surface that a media sheet can stick to. When required, the piezoelectric actuators can touch the surface with a given load. The stripper finger can lose contact with its contacting surface by a given gap when a voltage is applied to the piezoelectric actuator. The gap can be controlled by either a mechanical stop and/or by the voltage applied to the piezoelectric actuator. The gap used can depend on the surface architecture and properties of the media.

According to some embodiments, a piezoelectric actuator can apply a prescribed load of a stripper finger tip against a contact surface. The piezoelectric actuator can also move the stripper finger tip away from the contact surface by a given gap. For example, the thinner media that may require stripping can be about 54 to 75 um thick. A stripper finger can touch a fusing or photoreceptor surface to strip the media from the surface. Media that may not require the stripper fingers to strip the media on typical fuser and photoreceptor surfaces can be approximately 200 um thick. By lifting the stripper finger from its contacting surface by 50 um to 100 um, the stripper finger tip can avoid touching the contacting surface and at the same time avoid interfering with the exit path of thick media that may not require stripper finger stripping.

As an example for moving a stripper finger, a two-layer bending piezoelectric-actuator can have a stripper finger attached at the top and end of it. The stripper finger can either touch the contact surface or can be separated from the contact surface by a gap. Both the finger contact force and the gap can be controlled by the amount and polarity of the voltage applied to the piezoelectric-actuator. The force that can be applied at the tip of the stripper finger and the lift that can be achieved by the tip of the stripper finger can be dependent on the voltage applied to the piezoelectric actuator, the materials of the piezoelectric actuator, and the dimensions of the piezoelectric actuator.

According to one experiment, a stripper finger can apply a load at its tip of ~0.2N. The dimensions such a stripper finger can be about 25 mm long and 3 mm wide. A two-layer bending piezoelectric-actuator coupled to the stripper finger can be used to apply such load. A two-layer bending piezoelectric-actuator stripper finger with a width=3 mm, length=25 mm, thickness ~400 um, and a PSI-5A4 piezoelectric material can apply that load when ~70VDC is applied to the two-layer piezoelectric-actuator. Reversing the polarity of the voltage can lift the stripper finger off the contacting surface. The finger tip can lift from the surface by about 100 um when a reversed voltage of ~70VDC is applied. While piezoelectric-electric actuators can use high DC voltages, they may use very small currents, in the order of mAmps. The high voltages can be obtained from a small voltage booster.

By using a stripper finger from some embodiments, the amount of time that the finger is touching the contacting surface can be limited, which can dramatically increase the life of either a fuser roll or belt, a pressure roll or belt, a photoreceptor drum or belt, or other rotational members. This can be useful for all users, including users who either only occasionally run light weight media or who do not run light weight media at all.

According to some embodiments, a printing apparatus can include a media path configured to transport a media sheet. The printing apparatus can include an image generation module configured to generate an image on the media sheet. The printing apparatus can include a rotational member configured to contact the media sheet. The printing apparatus can include a stripper finger having a length along a longitudinal axis. The stripper finger can include a tip at an end of the length. The stripper finger can be configured to strip the media sheet from the rotational member. The printing apparatus can include a piezoelectric actuator coupled to the stripper finger. The printing apparatus can include a voltage source coupled to the piezoelectric actuator. The voltage source can be configured to apply a first voltage to the piezoelectric actuator to engage contact between the stripper finger tip and the rotational member to strip the media sheet from the rotational member. The voltage source can be configured to apply a second voltage to the piezoelectric actuator to disengage contact between the stripper finger tip and the rotational member. The voltage source can be configured to adjust a voltage applied to the piezoelectric actuator to adjust pressure of the stripper finger tip against the rotational member when the stripper finger tip contacts the rotational member.

Figure 5:
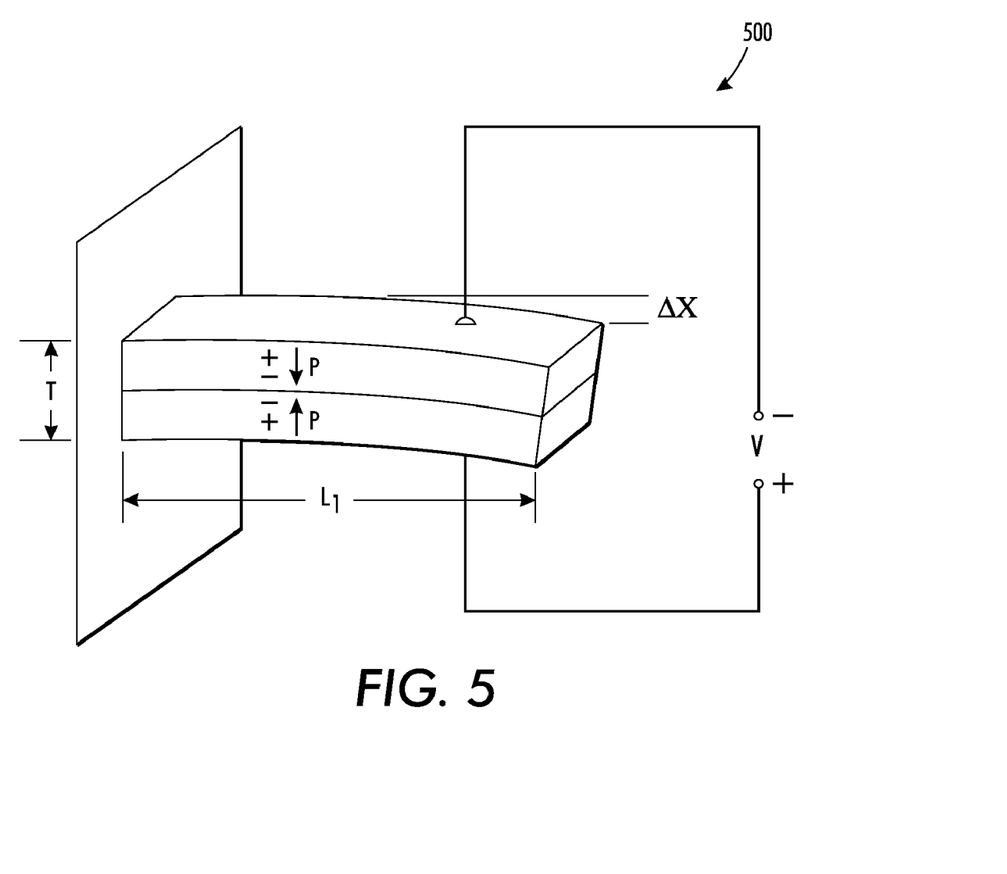
FIG. 5 is an exemplary illustration of a piezoelectric actuator.

FIG. 5 is an exemplary illustration of a piezoelectric actuator 500, such as the piezoelectric actuator 220. The piezoelectric actuator 500 can have a thickness, T, and a length, $L_1$. Each layer of the piezoelectric actuator 500 in this example can have a 5A4E piezo systems material designation type that can have a polarity P and a piezo strain coefficient $d_{yz}$, where y can indicate the axis of polarization and z can indicate a strain direction axis, where these variables y and z do not necessarily specifically correspond to a y-axis or z-axis. For example, $d_{31}$ can indicate polarization is aligned to a z-axis for the subscript "3" and strain direction is aligned to an x-axis perpendicular to the z-axis for the subscript "1." This example describes PSI-5A4E piezoelectric material only for illustrative purposes and many different piezoelectric materials can be used. When a voltage V is applied to the piezoelectric actuator, the piezoelectric actuator can bend or move a displacement distance $\Delta X$ based on the applied voltage V according to:

$$\Delta X = \frac{2L_1^2 V d_{31}}{T^2}$$

Figure 6:
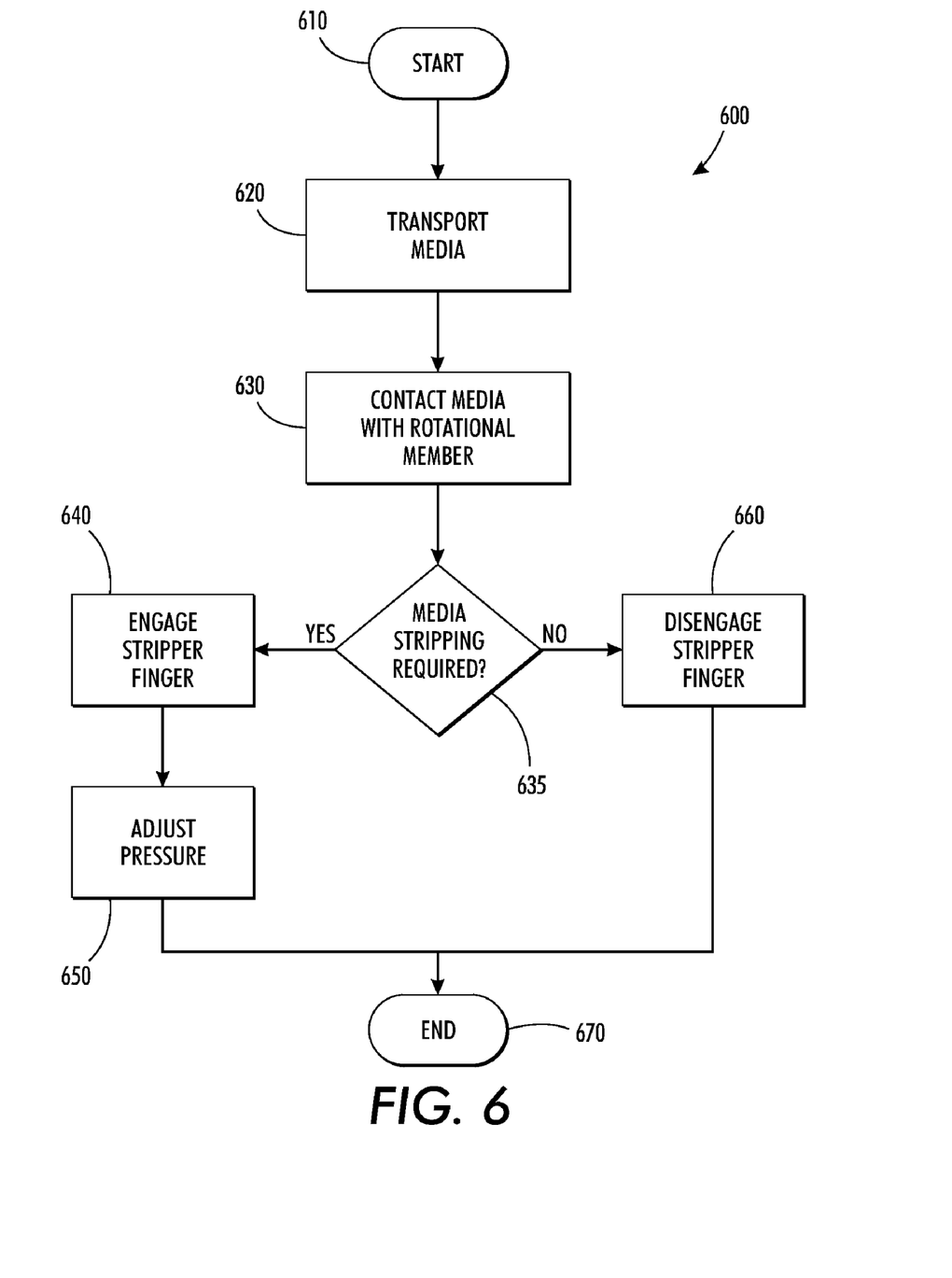
FIG. 6 illustrates an exemplary flowchart of a method in an apparatus.

FIG. 6 illustrates an exemplary flowchart 600 of a method in an apparatus that can include a media path, a rotational member, and a stripper finger having a length along a longitudinal axis. The stripper finger can include a tip at an end of the length. The printing apparatus can also include a piezoelectric actuator coupled to the stripper finger. The printing apparatus can additionally include a voltage source coupled to the piezoelectric actuator.

The method can start at 610. At 620, a media sheet can be transported in the media transport path. At 630, the media sheet can contact the rotational member. At 635, a determination can be made as to whether media stripping is required. This determination can be based on whether or not there is a media sheet coupled to the rotational member, can be based on whether a media sheet coupled to the rotational member requires stripping or not, or can be based on any other information relevant to whether media stripping is required.

If stripping is required, at 640, the stripper finger tip can engage contact with the rotational member to strip the media sheet from the rotational member. The piezoelectric actuator can cause the stripper finger tip to engage contact with the rotational member to strip the media sheet from the rotational member. The voltage source can apply a first voltage to the piezoelectric actuator to cause the piezoelectric actuator to move the stripper finger tip to engage contact with the rotational member to strip the media sheet from the rotational member. At 650, the piezoelectric actuator can adjust pressure of the stripper finger tip against the rotational member when the stripper finger tip contacts the rotational member.

If stripping is not required, at 660, the stripper finger tip can disengage contact with the rotational member. The piezoelectric actuator can cause the stripper finger tip to disengage contact with the rotational member. The voltage source can apply a second voltage to the piezoelectric actuator to cause the piezoelectric actuator to move the stripper finger tip to disengage contact with the rotational member. The stripper finger tip can disengage contact with the rotational member when there is no media sheet coupled to the rotational member. At 670, the method can end.

According to some embodiments, all of the blocks of the flowchart 600 are not necessary. Additionally, the flowchart 600 or blocks of the flowchart 600 may be performed numerous times, such as iteratively. For example, the flowchart 600 may loop back from later blocks to earlier blocks. Furthermore, many of the blocks can be performed concurrently or in parallel processes.

Embodiments may be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

Although portions of the above description are directed toward examples of xerographic printing, it will be understood that the teachings and claims herein can be applied to stripping of media sheets in any apparatus. For example, while this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. An apparatus comprising:
    a media path configured to transport a media sheet;
    a rotational member configured to contact the media sheet;
    a stripper finger having a length along a longitudinal axis, the stripper finger including tip at an end of the length, wherein the stripper finger is configured to selectively engage and disengage contact between the tip and the rotational member to selectively strip the media sheet from the rotational member; and
    a piezoelectric actuator coupled to the stripper finger, the piezoelectric actuator configured to selectively engage and disengage contact between the stripper finger tip and the rotational member, wherein the piezoelectric actuator is configured to adjust pressure of the stripper finger tip against the rotational member when the stripper finger tip contacts the rotational member.

2. The apparatus according to claim 1, wherein the piezoelectric actuator is configured to bend to selectively engage and disengage contact between the stripper finger tip and the rotational member.

3. The apparatus according to claim 1, further comprising a voltage source coupled to the piezoelectric actuator, the voltage source configured to apply a first voltage to the piezoelectric actuator to engage contact between the stripper finger tip and the rotational member and configured to apply a second voltage to the piezoelectric actuator to disengage contact between the stripper finger tip and the rotational member.

4. The apparatus according to claim 1, wherein the piezoelectric actuator includes a first layer coupled to the stripper finger along at least a portion of the length and a second layer coupled to the first layer substantially parallel to the longitudinal axis.

5. The apparatus according to claim 4, further comprising a voltage source configured to apply a voltage between the piezoelectric actuator first layer and the piezoelectric actuator second layer to selectively engage and disengage contact between the stripper finger tip and the rotational member.

6. The apparatus according to claim 1, wherein the stripper finger is configured to selectively engage contact between the tip and the rotational member to strip the media sheet from the rotational member and is configured to disengage contact between the tip and the rotational member when there is no media sheet coupled to the rotational member.

7. The apparatus according to claim 1, wherein the stripper finger is configured to selectively engage contact between the stripper finger tip and the rotational member to strip a first weight media sheet from the rotational member and is configured to disengage contact between the stripper finger tip and the rotational member for a second weight media sheet, where the second weight is greater than the first weight.

8. The apparatus according to claim 7, wherein the first weight media sheet has a first thickness,
    wherein the second weight media sheet has a second thickness greater than the first thickness, and
    wherein the stripper finger is configured to engage contact between the stripper finger tip and the rotational member for the first weight media sheet to strip the first weight media sheet from the rotational member and is configured to move a displacement distance to disengage contact between the stripper finger tip and the rotational member for the second weight media sheet, where the displacement distance is substantially between the first thickness and the second thickness.

9. The apparatus according to claim 1, further comprising a mechanical stop configured to contact the stripper finger after the stripper finger moves a displacement distance from the rotational member after the stripper finger tip disengages contact with the rotational member.

10. The apparatus according to claim 1, wherein the rotational member comprises a photoreceptor.

11. The apparatus according to claim 1, further comprising a fuser configured to fuse the image on the media sheet, wherein the rotational member comprises a roll in the fuser.

12. A method in an apparatus including a media path, a rotational member, and a stripper finger having a length along a longitudinal axis, the stripper finger including a tip at an end of the length, the method comprising:
    transporting the media sheet in the media path;
    contacting the media sheet with the rotational member;
    engaging contact between the stripper finger tip and the rotational member to strip the media sheet from the rotational member;
    disengaging contact between the stripper finger tip and the rotational member; and
    adjusting pressure of the stripper finger tip against the rotational member when the stripper finger tip contacts the rotational member,
    wherein the apparatus includes a piezoelectric actuator coupled to the stripper finger, the pressure being adjusted using the piezoelectric actuator,
    wherein engaging comprises engaging contact, using the piezoelectric actuator, between the stripper finger tip and the rotational member to strip the media sheet from the rotational member, and
    wherein disengaging comprises disengaging contact between the stripper finger tip and the rotational member by using the piezoelectric actuator.

13. The method according to claim 12, wherein the apparatus includes a voltage source coupled to the piezoelectric actuator,
    wherein engaging comprises engaging contact between the stripper finger tip and the rotational member to strip the media sheet from the rotational member, where contact is engaged by applying a first voltage to the piezoelectric actuator, and
    wherein disengaging comprises disengaging contact between the stripper finger tip and the rotational member by applying a second voltage to the piezoelectric actuator.

14. The method according to claim 12, wherein disengaging comprises disengaging contact between the stripper finger tip and the rotational member when there is no media sheet coupled to the rotational member.

15. A printing apparatus comprising:
    a media path configured to transport a media sheet;
    an image generation module configured to generate an image on the media sheet;
    a rotational member configured to contact the media sheet;
    a stripper finger having a length along a longitudinal axis, the stripper finger including a tip at an end of the length, the stripper finger configured to strip the media sheet from the rotational member;
    a piezoelectric actuator coupled to the stripper finger; and
    a voltage source coupled to the piezoelectric actuator, the voltage source configured to apply a first voltage to the piezoelectric actuator to engage contact between the stripper finger tip and the rotational member to strip the media sheet from the rotational member and configured to apply a second voltage to the piezoelectric actuator to disengage contact between the stripper finger tip and the rotational member,
    wherein the voltage source is configured to adjust a voltage applied to the piezoelectric actuator to adjust pressure of the stripper finger tip against the rotational member when the stripper finger tip contacts the rotational member.

* * * * *